(12) United States Patent
Bewermeyer et al.

(10) Patent No.: US 11,982,364 B2
(45) Date of Patent: May 14, 2024

(54) VALVE FOR A FLUID SYSTEM AND FLUID SYSTEM FOR A VEHICLE

(71) Applicant: Hella GmbH & Co. KGaA, Lippstadt (DE)

(72) Inventors: Frank Bewermeyer, Bueren (DE); Horst Feldkamp, Lippstadt (DE); Dominik Niess, Lippstadt (DE); Sebastian Tiemeyer, Dortmund (DE); Benjamin Grothe, Wickede (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 160 days.

(21) Appl. No.: 17/732,229

(22) Filed: Apr. 28, 2022

(65) Prior Publication Data

US 2022/0349484 A1 Nov. 3, 2022

(30) Foreign Application Priority Data

Apr. 28, 2021 (DE) ...................... 10 2021 110 942.6

(51) Int. Cl.
| | |
|---|---|
| *F16K 11/08* | (2006.01) |
| *F16K 11/085* | (2006.01) |
| *F16K 27/06* | (2006.01) |

(52) U.S. Cl.
CPC ........ *F16K 11/0856* (2013.01); *F16K 27/065* (2013.01)

(58) Field of Classification Search
CPC ............................ F16K 11/0856; F16K 27/065
See application file for complete search history.

(56) References Cited

U.S. PATENT DOCUMENTS

| | | | |
|---|---|---|---|
| 6,640,835 B1* | 11/2003 | Rohrberg | ............... F16K 27/003 285/125.1 |
| 10,458,562 B2 | 10/2019 | Ozeki et al. | |
| 2013/0263949 A1 | 10/2013 | Bartnick et al. | |
| 2017/0152957 A1 | 6/2017 | Roche et al. | |
| 2018/0119827 A1 | 5/2018 | Ozeki | |
| 2018/0372235 A1* | 12/2018 | Smith | ................. F16K 11/0853 |
| 2019/0063623 A1 | 2/2019 | Dragojlov et al. | |

(Continued)

FOREIGN PATENT DOCUMENTS

| | | |
|---|---|---|
| DE | 202016004427 U1 | 10/2017 |
| DE | 102017124727 A1 | 5/2018 |
| DE | 102020115516 A1 | 12/2021 |

(Continued)

*Primary Examiner* — Kevin R Barss
(74) *Attorney, Agent, or Firm* — Muncy, Geissler, Olds & Lowe, P.C.

(57) ABSTRACT

A valve for a fluid system of a vehicle having a valve housing having a plurality of valve housing openings, a valve body arranged in the valve housing so as to be rotatable about an axis of rotation and having at least one flow-conducting connecting channel for the flow-conducting connection of at least two valve housing openings of the plurality of valve housing openings, a valve seal, arranged between the valve housing and the valve body and having valve seal openings corresponding to the valve housing openings, a valve drive for the automatic rotation of the valve body about the axis of rotation, and a plurality of connecting pieces, corresponding to the valve housing openings, for the flow-conducting connection of the valve to the rest of fluid system.

9 Claims, 6 Drawing Sheets

(56) References Cited

U.S. PATENT DOCUMENTS

2020/0386331 A1* 12/2020 Chapman ............... F16K 25/00
2021/0172555 A1   6/2021 Colin et al.

FOREIGN PATENT DOCUMENTS

| EP | 3530901 A1 | 8/2019 |
| JP | 2018100682 A | 6/2018 |
| WO | WO2021069680 A1 | 4/2021 |
| WO | WO2022161826 A1 | 8/2022 |

* cited by examiner

VALVE FOR A FLUID SYSTEM AND FLUID SYSTEM FOR A VEHICLE

This nonprovisional application claims priority under 35 U.S.C. § 119(a) to German Patent Application No. 10 2021 110 942.6, which was filed in Germany on Apr. 28, 2021, and which is herein incorporated by reference.

BACKGROUND OF THE INVENTION

Field of the Invention

The present invention relates to a valve for a fluid system and to a fluid system of a vehicle.

Description of the Background Art

Valves of this kind for fluid systems and fluid systems for vehicles are already known from the state of the art in numerous design variants. The known valves for fluid systems of vehicles comprise a valve housing having a plurality of valve housing openings, a valve body, arranged in the valve housing so as to be rotatable about an axis of rotation and having at least one flow-conducting connecting channel for the flow-conducting connection of at least two valve housing openings of the plurality of valve housing openings, a valve seal, arranged between the valve housing and the valve body and having valve seal openings corresponding to the valve housing openings, a valve drive for the automatic rotation of the valve body about the axis of rotation, and a plurality of connecting pieces, corresponding to the valve housing openings, for the flow-conducting connection of the valve to the rest of the fluid system. The connecting pieces known in this regard from the prior art usually have a circular inner contour and a circular outer contour in cross section.

SUMMARY OF THE INVENTION

It is therefore an object of the present invention to improve a valve for a fluid system and a fluid system of a vehicle.

The object is achieved by a valve for a fluid system of a vehicle, which is characterized in that at least one of the connecting pieces is designed and arranged such that optionally a hose or a pump of the fluid system can be directly connected to the valve in a flow-conducting manner by means of said connecting piece. Further, this problem is solved by a fluid system of a vehicle according to claim 8. The vehicle can be a land vehicle designed as a motor vehicle, for example. Motor vehicles designed as an electric vehicle or as a so-called hybrid vehicle are mentioned here purely by way of example. However, the invention can also be used advantageously in other land vehicles as well as in air and sea vehicles. The valve of the invention can preferably be a so-called multi-way valve. This is not necessarily the case, however. The dependent claims relate to advantageous refinements of the invention.

In particular, a significant advantage of the invention is that a valve for a fluid system and a fluid system of a vehicle are improved.

Due to the inventive design of the valve for a fluid system of a vehicle and of the fluid system of a vehicle, the aforementioned valve and the aforementioned fluid system can be realized, on the one hand, in a particularly simple manner in terms of design and production technology. The invention makes it possible for more complex fluid systems with, for example, more complex valves, such as multi-way valves, and with further components of said fluid systems, said components connected to said valves in a flow-conducting manner, to be realized relatively simply compared to the prior art. For example, extensive centralization of the assemblies of fluid systems, such as, for example, fluid tanks, pumps, and the aforementioned valves, is made possible by means of the invention. This allows, for example, housing parts for a plurality of assemblies of a fluid system, for example, the aforementioned assemblies, to be used simultaneously. According to the invention, it is no longer necessary for the individual assemblies of a fluid system to be individually connected to one another in a flow-conducting manner by means of additional hoses or the like, as is customary in the prior art. Further, it is possible by means of the invention that at least one of the plurality of connecting pieces can be optionally connected directly to a hose or a pump in a flow-conducting manner. Accordingly, the flexibility of the valve and the fluid system equipped with it is significantly increased. The phrase "connectable directly in a flow-conducting manner" means that either the hose or the pump can be connected directly to said connecting piece of the valve. For example, it is therefore not necessary for the aforementioned pump to be connected to the connecting piece in a flow-conducting manner by means of an additional hose.

In principle, the valve of the invention can be freely selected within wide suitable limits in terms of type, functioning, material, and dimensioning.

A cross section of a free end of the connecting piece can be arranged transversely to the corresponding valve housing opening, preferably perpendicular to the axis of rotation. In this way, the direct flow-conducting connection of the hose or pump to said connecting piece is further improved in terms of design and production technology. On the other hand, this enables a very compact and thus space-saving design of the valve and of the fluid system equipped with it.

The connecting piece can be formed such that a plurality of valve housing openings, preferably a plurality of valve housing openings, arranged one above the other along the axis of rotation, can be connected to the hose or the pump in a flow-conducting manner by means of said connecting piece. The compactness of the valve and the fluid system equipped with it is further improved thereby. This applies in particular to the preferred embodiment of this refinement.

The connecting piece can be formed as an integral part of the valve housing, preferably that said connecting piece is molded directly onto the valve housing. In this way, the number of components and thus the structural complexity of the valve and the fluid system equipped with it can be reduced. This can be realized in a particularly simple manner in terms of design and production technology by means of the preferred embodiment of this refinement.

A free end of the connecting piece can be formed as a valve-side coupling part of a coupling for optionally coupling the valve directly to the hose or the pump, preferably as a valve-side quick coupling part of a quick coupling. As a result, the flow-conducting connection between the valve of the invention on one side and the hose or pump on the other side is realizable as very easy to assemble and disassemble. This applies in particular to the preferred embodiment of this refinement. Couplings, and thereby also quick couplings, are standard components that are available in a wide range of designs and can be used for a large number of applications different from one another.

Further, a free end of said connecting piece can be formed as a valve-side coupling part of a coupling for optionally coupling the valve directly to the hose or the pump, preferably as a valve-side quick coupling part of a quick coupling, and, on the other hand, the hose and the pump each have a coupling part corresponding to the valve-side coupling part, preferably a quick coupling part corresponding to the valve-side quick coupling part.

The connecting piece can have a circular flow passage area in cross section at a free end and the valve housing opening, corresponding to said connecting piece, has a substantially rectangular cross section, wherein the valve housing opening is larger than the flow passage area at the free end of said connecting piece, and wherein the flow passage area of said connecting piece widens in a diffuser-like manner from its free end to the corresponding valve housing opening and merges in a stepless manner into the valve housing opening. In this way, a flow-optimized shaping of the connecting pieces and the corresponding valve housing openings is realized. This is because, in contrast to the prior art, the invention makes it possible for the connecting pieces and the valve housing openings corresponding thereto to also have cross sections with non-circular inner contours. The cross sections with substantially rectangular inner contours have a clear width that is greater in each case than that of a cross section with a circular inner contour. It is thus possible according to the invention to utilize particularly well the available installation space for the valve housing openings in the valve housing. The installation space for the valve housing openings in the valve housing is severely limited circumferentially, therefore, concentrically around the axis of rotation of the valve body. Accordingly, circular valve housing openings, for example, can only be enlarged to a limited extent in order to optimize the flow through the respective valve housing opening and the connecting piece corresponding thereto.

The valve housing can be formed as an integral part of a fluid tank of the fluid system, preferably of a coolant tank of the vehicle for storing coolant carried in the fluid system formed as a coolant system. As a result, on the one hand, the number of fluid system components is reduced. Accordingly, the logistics, warehousing, and manufacturing of the fluid system for a vehicle are simplified. On the other hand, this enables a very compact and thus space-saving design of the fluid system.

Analogous to the valve of the invention, the fluid system of the invention can also be freely selected within wide suitable limits in terms of type, functioning, material, and dimensioning.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
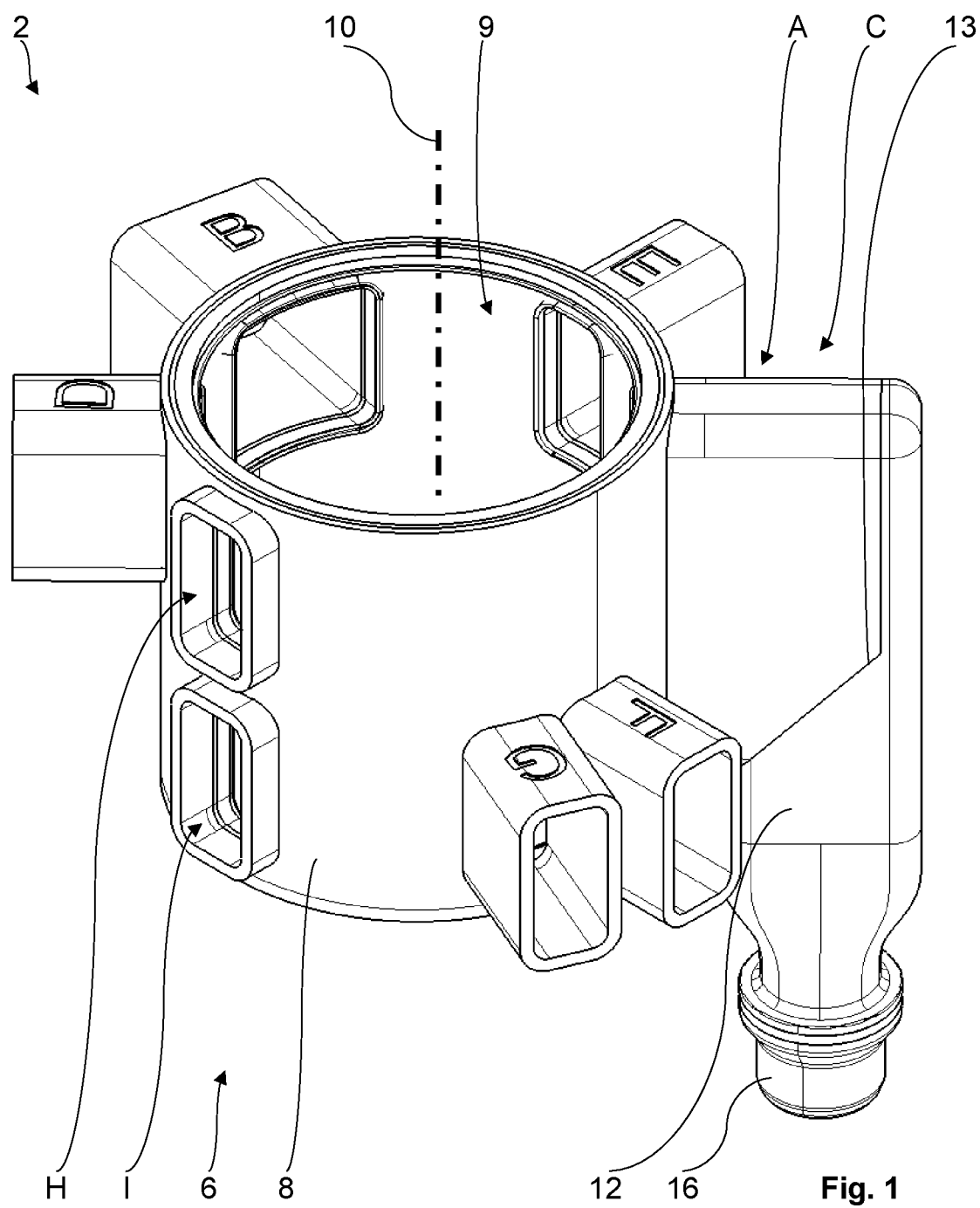
FIG. 1 shows an exemplary embodiment of a valve of the invention of a fluid system of the invention in a partial perspective view.
Figure 2:
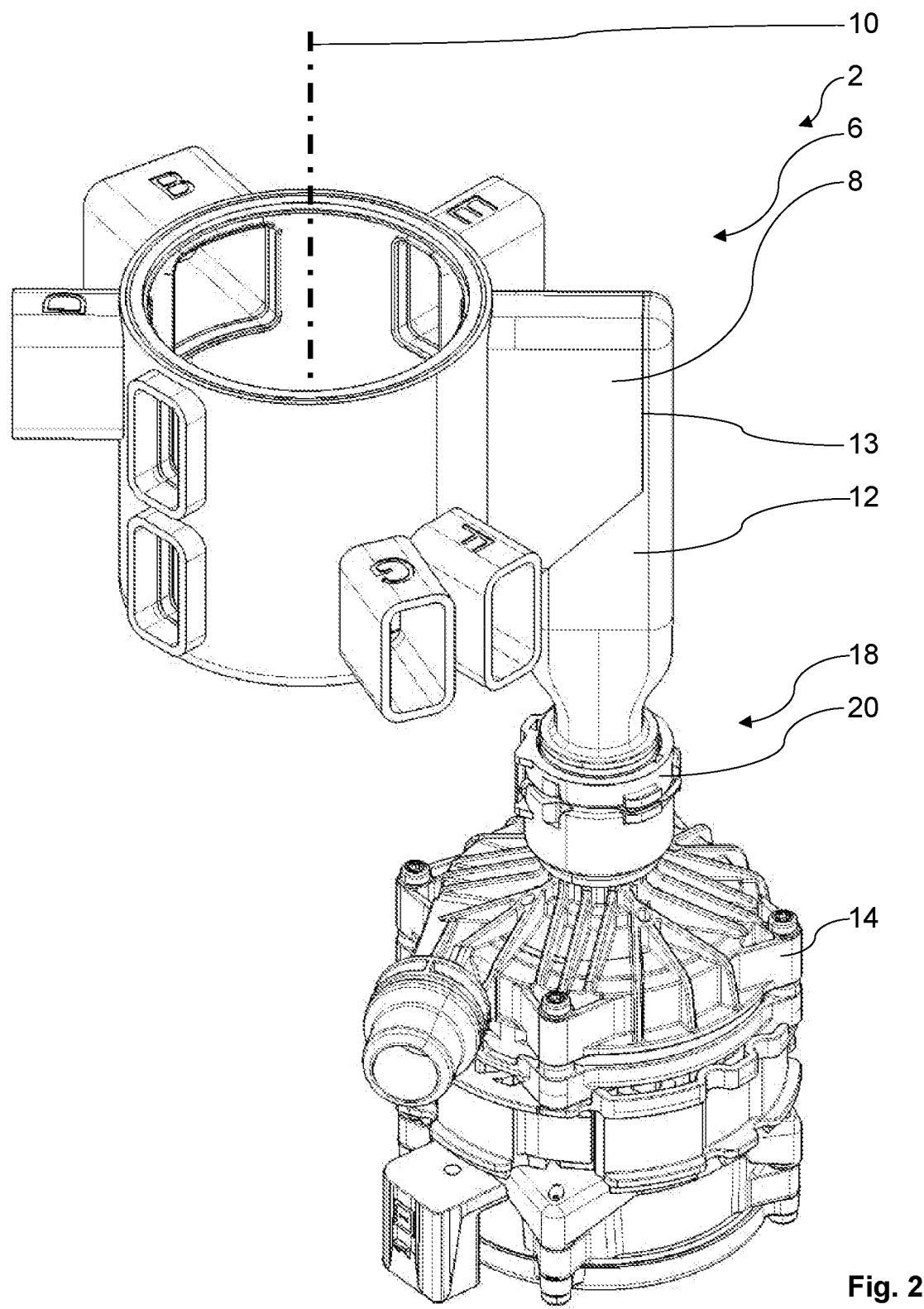
FIG. 2 shows the fluid system according to the example embodiment in a partial perspective view.
Figure 3:
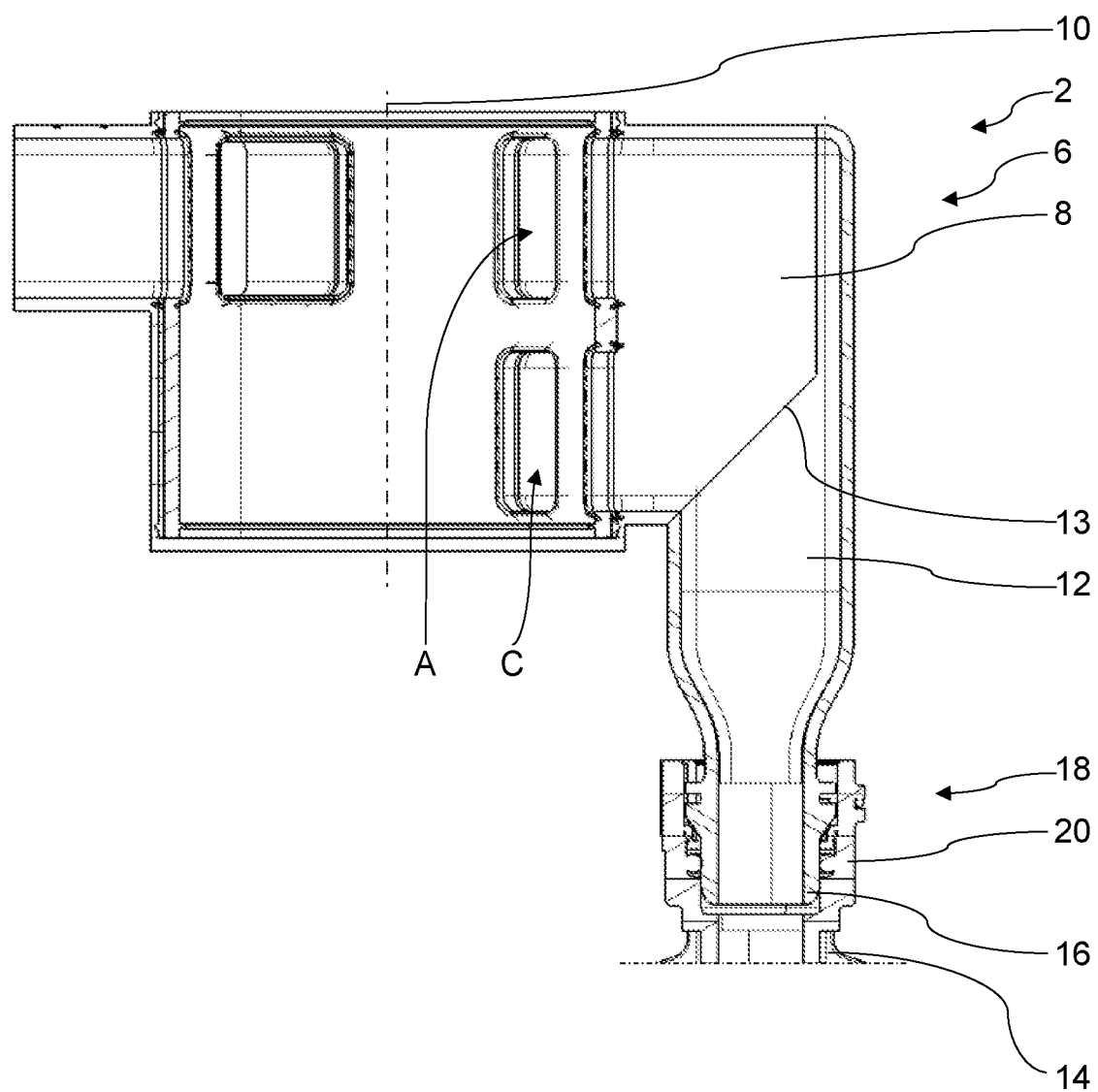
FIG. 3 shows the fluid system according to FIG. 2 in a partial sectional side view.

A first exemplary embodiment of a fluid system of the invention of a vehicle with the valve of the invention is shown purely as an example in FIGS. 1 to 3.

The vehicle is designed here as a motor vehicle, namely, a pure electric vehicle, and is not shown in more detail.

In the present exemplary embodiment, fluid system 2 for the vehicle is designed as a coolant system for cooling the traction battery and the drive motor together with the power electronics corresponding thereto, and for cooling a refrigerant circuit for air conditioning an interior of the vehicle. The traction battery, the drive motor with the corresponding power electronics, and the refrigerant circuit of the vehicle are also not shown in detail here and are designed, for example, in a manner known per se to the skilled artisan.

Fluid system 2, designed as a coolant system, comprises a fluid tank (not shown), formed as a coolant tank, for storing a fluid (not shown) of the vehicle, said fluid formed as a coolant, a total of three fluid circuits which are connected in a flow-conducting manner to the fluid tank and formed as coolant circuits in which the fluid circulates, and a valve 6 connected in a flow-conducting manner, on the one hand, to the fluid circuits and, on the other hand, to the fluid tank for controlling the fluid flows of the fluid in fluid system 2, said fluid flows being formed as coolant flows. The fluid circuits are also not shown.

Valve 6 is formed here as a so-called multi-way valve and comprises a valve housing 8 with a plurality of valve housing openings, a valve body arranged in valve housing 8 so as to be rotatable about an axis of rotation 10 and having at least one flow-conducting connecting channel for the flow-conducting connection of at least two valve housing openings of the plurality of valve housing openings, a valve seal, arranged between valve housing 8 and the valve body and having valve seal openings corresponding to the valve housing openings, a valve drive for the automatic rotation of the valve body about the axis of rotation 10, and a plurality of connecting pieces, corresponding to the valve housing openings, for the flow-conducting connection of valve 6, namely, the valve housing openings, to the rest of fluid system 2.

The valve housing openings of valve housing 8 of valve 6 are labeled in FIGS. 1 and 2 with reference characters A, C, H, and I and the letters B and D to G drawn on valve housing 8. Only connecting piece 12 of the aforementioned connecting pieces corresponding to the valve housing openings A and C is graphically shown in FIGS. 1 to 3. The valve body with the at least one connecting channel, the valve seal with the valve seal openings formed corresponding to the valve housing openings, and the valve drive are not shown in FIGS. 1 to 3.

In the present exemplary embodiment, valve housing 8 is formed as a plastic injection-molded part to which the connecting pieces, for example, connecting piece 12, which are also formed as plastic injection-molded parts, are injection-molded. Injection seam 13 can be clearly seen in FIGS. 1 to 3. Connecting piece 12 is thus formed as an integral part of valve housing 8. In this case, sliders can be used in particular in the production of valve housing 8. In principle, however, other connection techniques are also conceivable. Depending on the requirements of the individual case, the skilled artisan will select the appropriate connection technique for joining. Plastic welding, adhesive techniques, and screw connections are only mentioned here as alternative connection techniques purely as an example.

According to the invention, at least one of the connecting pieces, for example, connecting piece 12, is designed and arranged such that optionally a hose (not shown) or a pump 14 of fluid system 2 can be connected directly to valve 6 by means of said connecting piece 12 in a flow-conducting manner. See FIGS. 2 and 3 in this regard. For this purpose, the free end of said connecting piece 12 is formed as a valve-side coupling part 16 of a coupling 18 for optionally coupling valve 6 directly to the aforementioned hose or pump 14, namely, as a valve-side quick coupling part of a quick coupling.

Accordingly, in the present exemplary embodiment, fluid system 2 additionally has at least the aforementioned hose and at least pump 14, wherein, on the one hand, connecting piece 12 of valve 6 and, on the other hand, the hose and pump 14 are designed and arranged such that optionally the hose or pump 14 can be directly connected to said connecting piece 12 in a flow-conducting manner. For this purpose, on the one hand, the free end of said connecting piece 12 is formed as the valve-side coupling part 16 of coupling 18 for optionally coupling valve 6 directly to the aforementioned hose or pump 14, and, on the other hand, the aforementioned hose and pump 14 each have a coupling part 20 corresponding to the valve-side coupling part 16, namely, a quick-coupling part corresponding to the valve-side quick-coupling part.

As can be seen from an overview of FIGS. 1 to 3, connecting piece 12 is formed here such that a plurality of valve housing openings, namely, valve housing openings A and C arranged one above the other along axis of rotation 10, can be connected to the aforementioned hose or pump 14 in a flow-conducting manner by means of said connecting piece 12. In the present exemplary embodiment, moreover, a cross section of the free end of said connecting piece 12 is arranged transversely to the corresponding valve housing openings A and C, namely, perpendicular to axis of rotation 10.

For the purpose of flow optimization, the connecting pieces, for example, connecting piece 12, of the present exemplary embodiment has a circular flow passage area in cross section at the free end of the respective connecting piece, and the valve housing openings corresponding to the connecting pieces, for example, the valve housing openings A and C corresponding to connecting piece 12, each have a substantially rectangular cross section, wherein the respective valve housing opening, for example, valve housing openings A and C, is larger than the flow passage area at the free end of the corresponding connecting piece, for example, connecting piece 12, and wherein the flow passage areas of the connecting pieces, for example, connecting piece 12, widen in a diffuser-like manner from the free end of the respective connecting piece, for example, connecting piece 12, to the respective corresponding valve housing opening, for example, valve housing opening A and C, and merge in a stepless manner into the respective valve housing opening, for example, valve housing opening A and C. The corners of these valve housing openings, for example, of the valve housing openings A and C, which are substantially rectangular in cross section, are rounded for the purpose of additional optimization of the flow.

Further, it can be seen from FIGS. 1 to 3 that valve housing openings, for example, valve housing openings A and C, which are substantially rectangular in cross section, are each formed at least in part such that a width, running perpendicular to axis of rotation 10, of said valve housing opening is formed to be smaller than a height, running parallel to axis of rotation 10, of said valve housing opening, wherein the width extends along valve housing opening, for example, valve housing openings A and C, arranged concentrically to axis of rotation 10.

Moreover, in the present exemplary embodiment, valve housing 8 is designed to be formable such that a sealing side 9, facing the valve seal, of valve housing 8 is formed substantially burr-free after demolding of valve housing 8. In terms of production technology, this is implemented here, for example, by structurally avoiding a mold separation on sealing side 9 of valve housing 8 in the case of the above-mentioned plastic injection-molded part, namely, valve housing 8.

Figure 4:
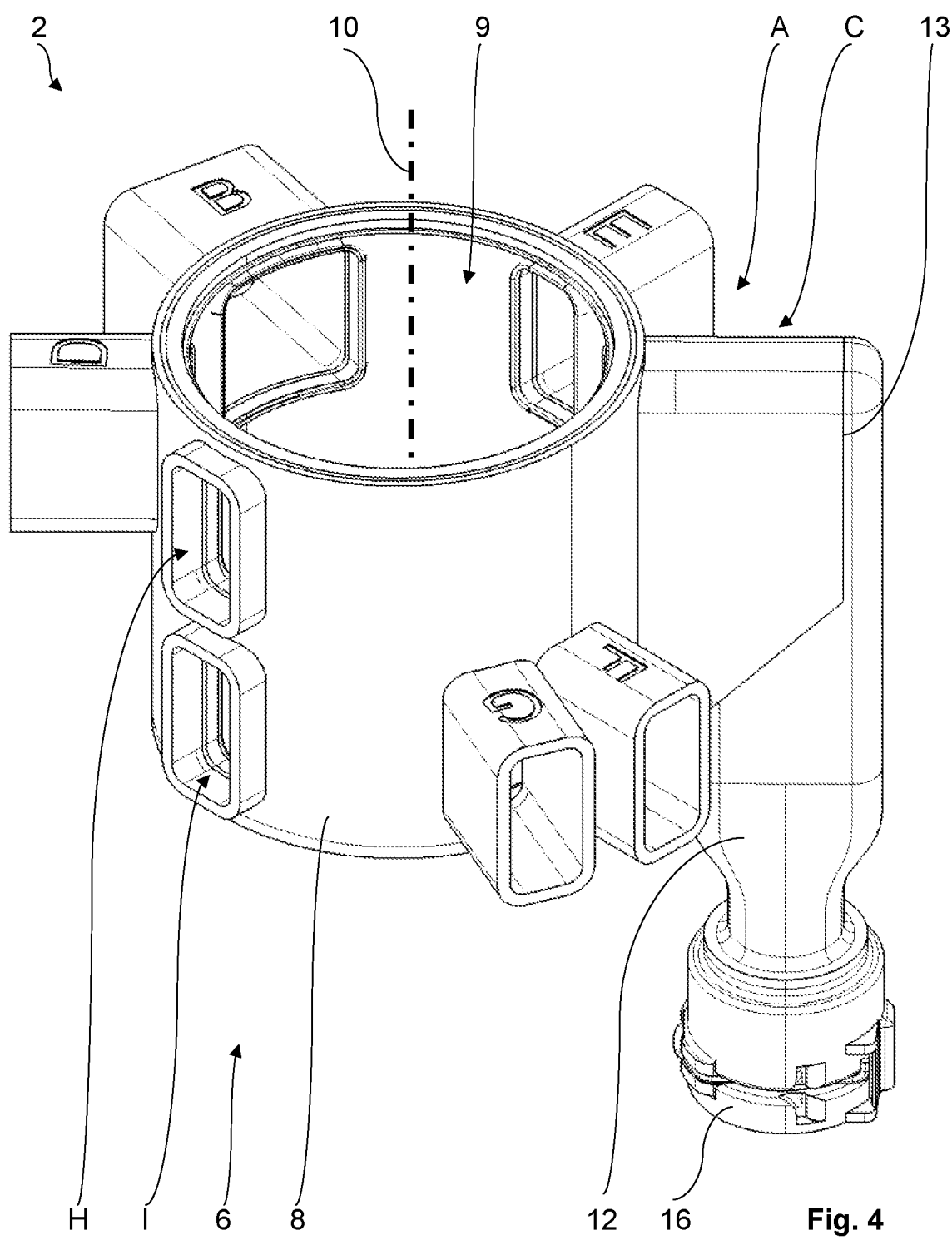
FIG. 4 shows an exemplary embodiment of a valve of the invention of a fluid system of the invention in a partial perspective view.
Figure 5:
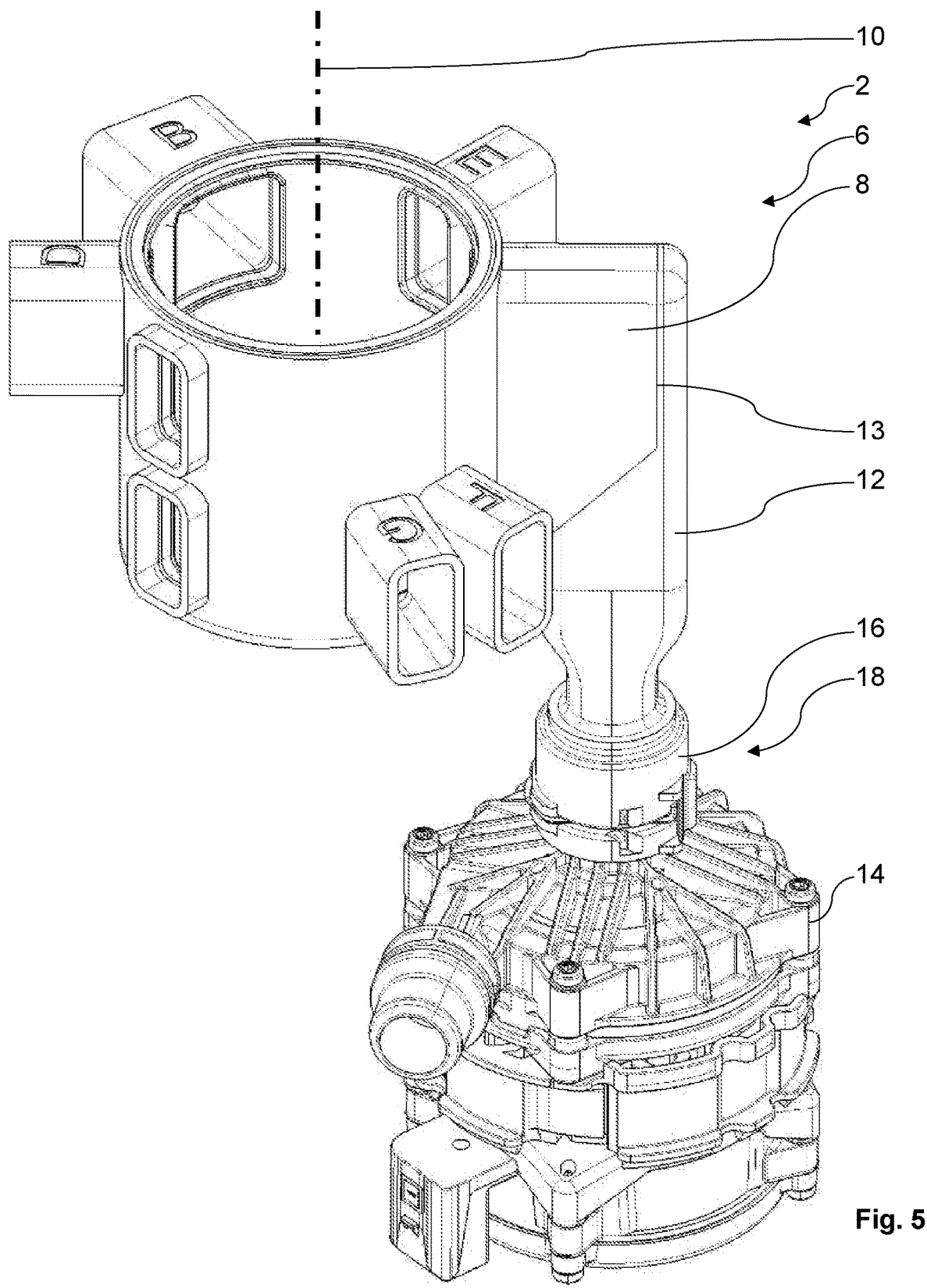
FIG. 5 shows the fluid system according to the exemplary embodiment in a partial perspective view.
Figure 6:
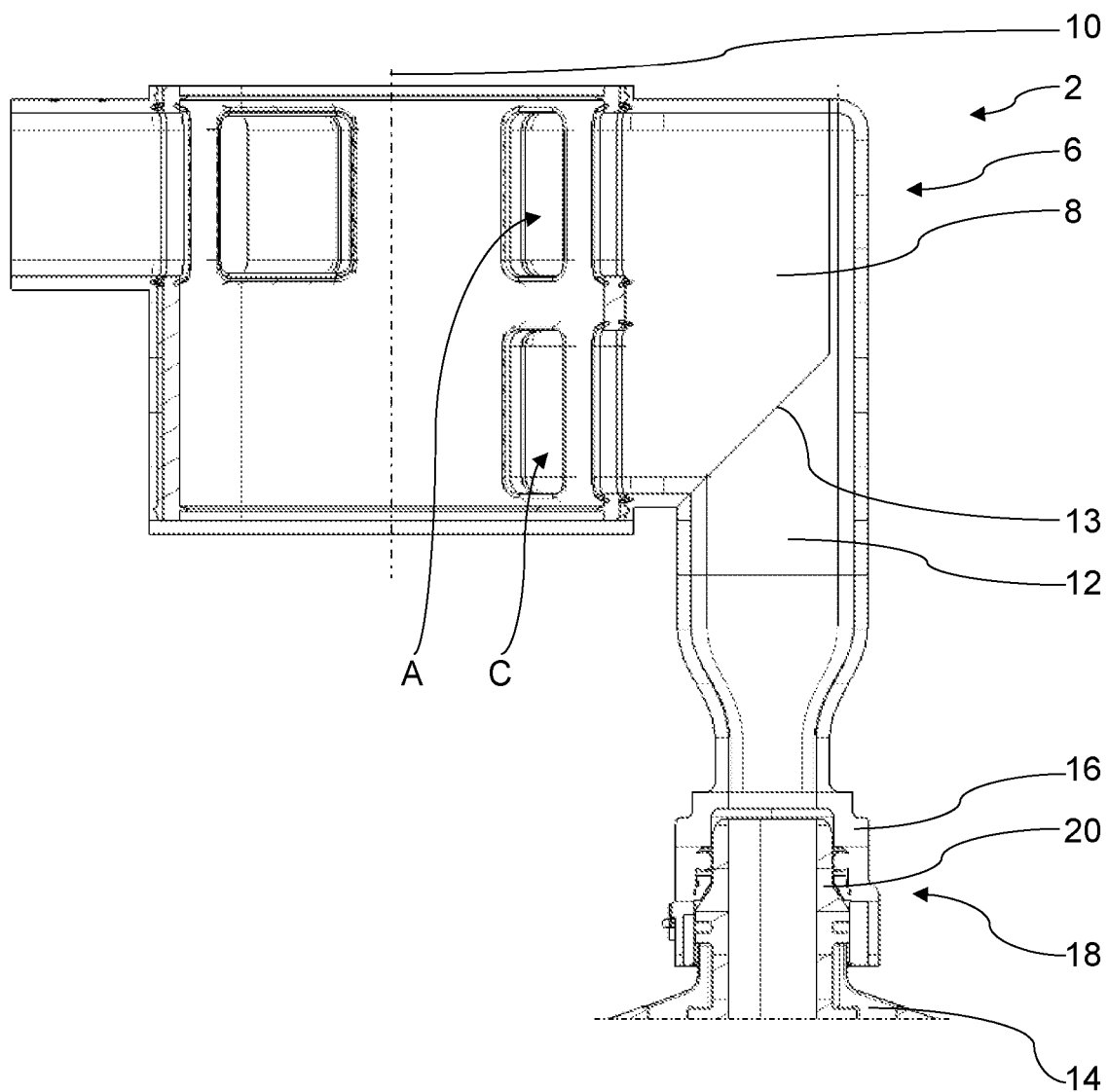
FIG. 6 shows the fluid system according to FIG. 5 in a partial sectional side view.

The second exemplary embodiment of the fluid system of the invention with the valve of the invention shown in FIGS. 4 to 6 is designed substantially identical to the first exemplary embodiment according to FIGS. 1 to 3. Identical or identically acting components are designated with the same reference characters in FIGS. 1 to 6.

Analogous to the first exemplary embodiment, on the one hand, connecting piece 12 of valve 6 and, on the other hand, the hose and pump 14 are designed and arranged such that optionally the hose or pump 14 can be directly connected to said connecting piece 12 in a flow-conducting manner. For this purpose, in the present second exemplary embodiment, again, on the one hand, the free end of said connecting piece 12 is formed as the valve-side coupling part 16 of coupling 18 for optionally coupling valve 6 directly to the aforementioned hose or pump 14, and, on the other hand, the aforementioned hose and pump 14 each have a coupling part 20 corresponding to the valve-side coupling part 16, namely, a quick-coupling part corresponding to the valve-side quick-coupling part. In contrast to the first exemplary embodiment, the valve-side coupling part 16 in the second exemplary embodiment is formed analogously to coupling part 20 of the first exemplary embodiment, and coupling part 20 of the second exemplary embodiment is formed analogous to the valve-side coupling part 16 of the first exemplary embodiment. See FIGS. 1 to 6 in an overview in this regard. Otherwise, the two exemplary embodiments are identical, so that reference can be made here to the above remarks on the first exemplary embodiment.

Due to the inventive design of the valve for a fluid system of a vehicle and of the fluid system for a vehicle, valve 6 and fluid system 2 can be realized in a particularly simple manner in terms of design and production technology. The invention makes it possible for more complex fluid systems 2 with, for example, more complex valves, such as multi-way valve 6, and with further components of said fluid systems, for example, pump 14, said components connected to said valves in a flow-conducting manner, to be realized relatively simply as well, compared to the prior art. For example, extensive centralization of the assemblies of fluid systems, such as, for example, the mentioned fluid tanks, pumps 14, and valve 6, is made possible by means of the invention. This allows, for example, housing parts for a plurality of assemblies of a fluid system 2, for example, the aforementioned assemblies, to be used simultaneously. According to the invention, it is no longer necessary for the individual assemblies of a fluid system to be individually connected to one another in a flow-conducting manner by means of additional hoses or the like, as is customary in the prior art. Further, it is possible by means of the invention that at least one of the plurality of connecting pieces, for example, connecting piece 12, can be optionally connected directly to the hose or pump 14 in a flow-conducting manner. Accordingly, the flexibility of valve 6 and fluid system 2 equipped with it is significantly increased.

The invention is not limited to the present exemplary embodiments. For example, the invention can also be used advantageously in other types of vehicles. This applies not only to land vehicles, but also to air and sea vehicles. Also see the introduction to the description in this regard.

In particular, the invention is not limited to the structural and production details of the exemplary embodiments. For example, the number of connecting pieces and of the corresponding valve housing openings and valve seal openings is not limited to the respective number in the exemplary embodiments, but can be freely selected within technical limits depending on the requirements of the individual case. The same applies to the spatial arrangement of the individual connecting pieces, which can also be freely selected depending on the spatial conditions of the particular application. Moreover, it is conceivable that the valve housing is formed as an integral part of a fluid tank of the fluid system, preferably of a coolant tank of the vehicle for storing coolant carried in the fluid system formed as a coolant system.

Of course, the invention can be used advantageously not only in vehicle fluid systems formed as coolant systems. Accordingly, the invention can be used for a variety of applications different from one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A valve for a fluid system of a vehicle, the valve comprising:
   a valve housing having a plurality of valve housing openings;
   a valve body arranged in the valve housing so as to be rotatable about an axis of rotation and having at least one flow-conducting connecting channel for the flow-conducting connection of at least two valve housing openings of the plurality of valve housing openings;
   a valve seal arranged between the valve housing and the valve body and having valve seal openings corresponding to the valve housing openings;
   a valve drive for the automatic rotation of the valve body about the axis of rotation; and
   a plurality of connecting pieces corresponding to the valve housing openings for the flow-conducting connection of the valve to the fluid system,
   wherein at least one of the connecting pieces is designed and arranged to connect to a hose of the fluid system and to a pump of the fluid system, individually, such that either the hose or the pump is optionally directly connected in a flow conducting manner to the valve via the at least one of the connecting pieces,
   wherein the at least one of the connecting pieces has a circular flow passage area in cross section at a free end and the valve housing opening corresponding to the at least one of the connecting pieces and has a substantially rectangular cross section, wherein the corresponding valve housing opening is larger than the flow passage area at the free end of the at least one of the connecting pieces, and wherein the flow passage area of the at least one of the connecting pieces widens in a diffuser-like manner from the free end to the corresponding valve housing opening and merges in a stepless manner into the corresponding valve housing opening.

2. The valve according to claim 1, wherein the cross section of the free end of the at least one of the connecting pieces is arranged transversely to the corresponding valve housing opening or substantially perpendicular to the axis of rotation.

3. The valve according to claim 1, wherein the at least one of the connecting pieces is formed such that some of the valve housing openings or some of the valve housing openings arranged one above the other along the axis of rotation are connected to the hose or the pump in a flow-conducting manner via the at least one of the connecting pieces.

4. The valve according to claim 1, wherein the at least one of the connecting pieces is formed as an integral part of the valve housing or wherein the at least one of the connecting pieces is molded directly onto the valve housing.

5. The valve according to claim 1, wherein a free end of the at least one of the connecting pieces is formed as a valve-side coupling part of a coupling for optionally coupling the valve directly to the hose or the pump or as a valve-side quick coupling part of a quick coupling.

6. A valve for a fluid system of a vehicle, the valve comprising:
   a valve housing having a plurality of valve housing openings;
   a valve body arranged in the valve housing so as to be rotatable about an axis of rotation and having at least one flow-conducting connecting channel for the flow-conducting connection of at least two valve housing openings of the plurality of valve housing openings;
   a valve seal arranged between the valve housing and the valve body and having valve seal openings corresponding to the valve housing openings;
   a valve drive for the automatic rotation of the valve body about the axis of rotation; and
   a plurality of connecting pieces corresponding to the valve housing openings for the flow-conducting connection of the valve to the fluid system,
   wherein at least one of the connecting pieces is designed and arranged to connect to a hose of the fluid system and to a pump of the fluid system, individually, such that either the hose or the pump is optionally directly connected in a flow conducting manner to the valve via the at least one of the connecting pieces, and
   wherein the valve housing is formed as an integral part of a fluid tank of the fluid system or of a coolant tank of the vehicle for storing coolant carried in the fluid system formed as a coolant system.

7. A fluid system of a vehicle, the system comprising:
   a fluid tank for storing a fluid of the fluid system;
   at least one fluid circuit connected in a flow-conducting manner to the fluid tank and in which the fluid circulates;
   a valve connected in a flow-conducting manner to the fluid circuit and/or the fluid tank;

a plurality of connecting pieces for the flow-conducting connection of the valve to the fluid system for controlling at least one fluid flow of the fluid in the fluid system;
at least one hose; and
at least one pump,
wherein at least one of the connecting pieces of the valve, the hose and the pump are designed and arranged such that optionally the hose or the pump is adapted to be directly connected to the at least one of the connecting pieces in a flow conducting manner.

8. The fluid system according to claim 7, wherein the valve comprises:
a valve housing having a plurality of valve housing openings;
a valve body arranged in the valve housing so as to be rotatable about an axis of rotation and having at least one flow-conducting connecting channel for the flow-conducting connection of at least two valve housing openings of the plurality of valve housing openings;
a valve seal arranged between the valve housing and the valve body and having valve seal openings corresponding to the valve housing openings;
a valve drive for the automatic rotation of the valve body about the axis of rotation; and
the plurality of connecting pieces corresponding to the valve housing openings for the flow-conducting connection of the valve to the rest of fluid system.

9. The fluid system according to claim 8, wherein a free end of the at least one of the connecting pieces is formed as a valve-side coupling part of a coupling for optionally coupling the valve directly to the hose or the pump or as a valve-side quick coupling part of a quick coupling, and, wherein the hose and the pump each have a coupling part corresponding to the valve side coupling part or a quick coupling part corresponding to the valve side quick coupling part.

* * * * *